Oct. 9, 1951 H. W. GOFF 2,570,940

KEY SEQUENCE INDICATING KEYSET

Filed July 31, 1947 2 Sheets-Sheet 1

INVENTOR
H. W. GOFF
BY [signature]
ATTORNEY

KEY SEQUENCE INDICATING KEYSET

Filed July 31, 1947 2 Sheets-Sheet 2

INVENTOR
H. W. GOFF
BY [signature]
ATTORNEY

Patented Oct. 9, 1951 2,570,940

UNITED STATES PATENT OFFICE 2,570,940

KEY SEQUENCE INDICATING KEYSET

Harold W. Goff, Manhasset, N. Y., assignor to Bell Telephone Laboratories, Incorporated, New York, N. Y., a corporation of New York Application July 31, 1947, Serial No. 765,171

2 Claims. (Cl. 177—380)

This invention relates to keyset-controlled mechanisms.

In many keyset-controlled machines, such as typewriters, operation of the keys produces a readable record visible to the operator. If the operation is suspended, there is no difficulty in determining, when operation is resumed, at what point the work was suspended, for it is plainly shown by the record. There are, however, many applications of the keyset, such as signal transmitters and registers, in which a permanent record of the results of key operation is not required and, in cases where the keys control code devices, such a record, if provided, may be unintelligible to the operator. However, if no intelligible record is visible to the operator, such devices are difficult to operate. If the attention of the operator is distracted, even for a moment, it may be found impossible to recall what keys were operated.

The present invention discloses a device which makes no permanent record, yet continually indicates the last several keys depressed and the order in which they were depressed. Constant concentration on the part of the operator is, therefore, not required with this invention and the work may be suspended with the assurance that it can be resumed again without difficulty. The invention is applicable to any keyset device although particularly valuable where no record is required or where the record made is invisible or unintelligible to the operator.

The invention will be more clearly understood from the accompanying description, the appended claims, and the drawings, in which:

Fig. 4 is a perspective view of the elements of the device shown in Fig. 3; while

Figures 3, 5:
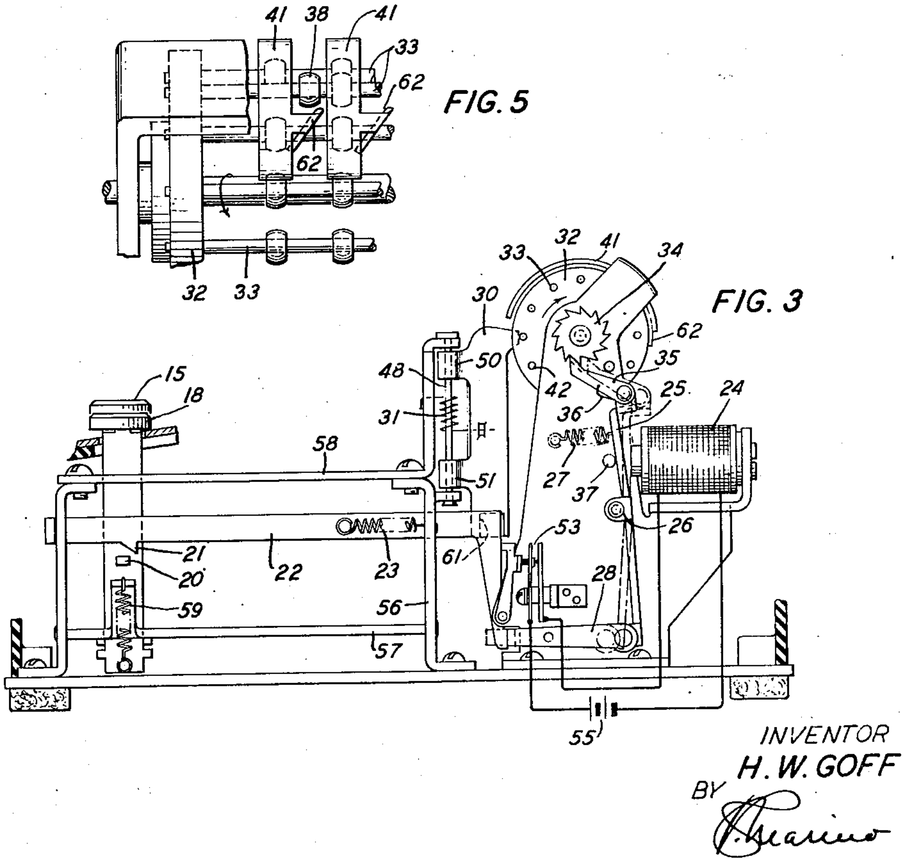
Fig. 3 is a side view of part of the mechanism more fully disclosed in Fig. 1, showing the position and relation of the parts controlled by an operated key.
Fig. 5 is a section along the line 5—5 of Fig. 1, showing the bead-restoring elements of the device, with parts enlarged for a clearer illustration thereof.

The drawings show the invention applied to a common form of keyset device. Each of the keys 1 . . . 18, when depressed, releases a spring-actuated slide of which one is provided for each key. For example, when key 18 is depressed (as shown in Fig. 3), the lug 20 on said key is removed from engagement with the projection 21 on slide 22 and said slide is drawn forward by spring 23, one end of said spring being fastened to a lug on the slide and the other to the upright 56, the latter also supporting the key guides 57 and 58. Operation of a key also energizes, by any suitable means and after an appropriate delay, magnet 24. One such means is shown in the drawing and comprises a battery 55 and the contacts 53 connected in a circuit with the winding of the magnet 24. Forward movement of the slide 22 by the contraction of spring 23, or of any slide by the contraction of its associated spring, closes contacts 53 by pressing against the swinging bail 54 extending across all of the slides, completing the circuit of and energizing magnet 24 which thereby attracts and rotates about its pivot against tension of spring 27, the armature 25, which is pivoted at 26. The slide 22 or any other displaced slide is thereby restored to its normal position by the bail 28 attached to armature 25 and extending across all of the slides. It should be noted that the bail 28 is pivotally connected to the lower portion of armature 25. Hence when said armature operates as above described, said bail is thrust rearwardly to engage the end portion of a displaced slide 22, restoring and locking the latter under the lug 20. When the slide is thus restored, magnet 24 is deenergized since contacts 53 are then opened, and its armature drawn back against the stop 37 by the spring 27. Magnet 24 will require a large amount of inductance to overcome the tension of springs 27 and 23, and its action should be sufficiently slow to restore properly the displaced slides.

Figure 1:
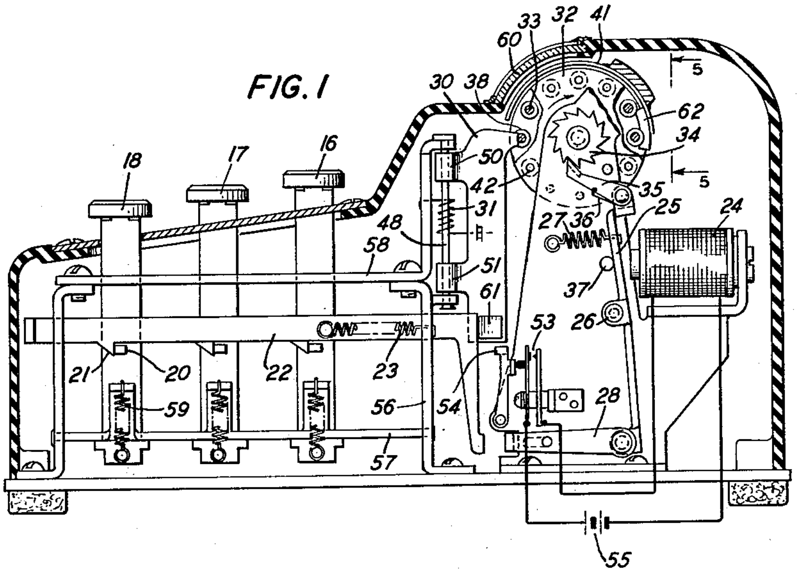
Fig. 1 is a side view, partly in section, of the device.
Figure 2:
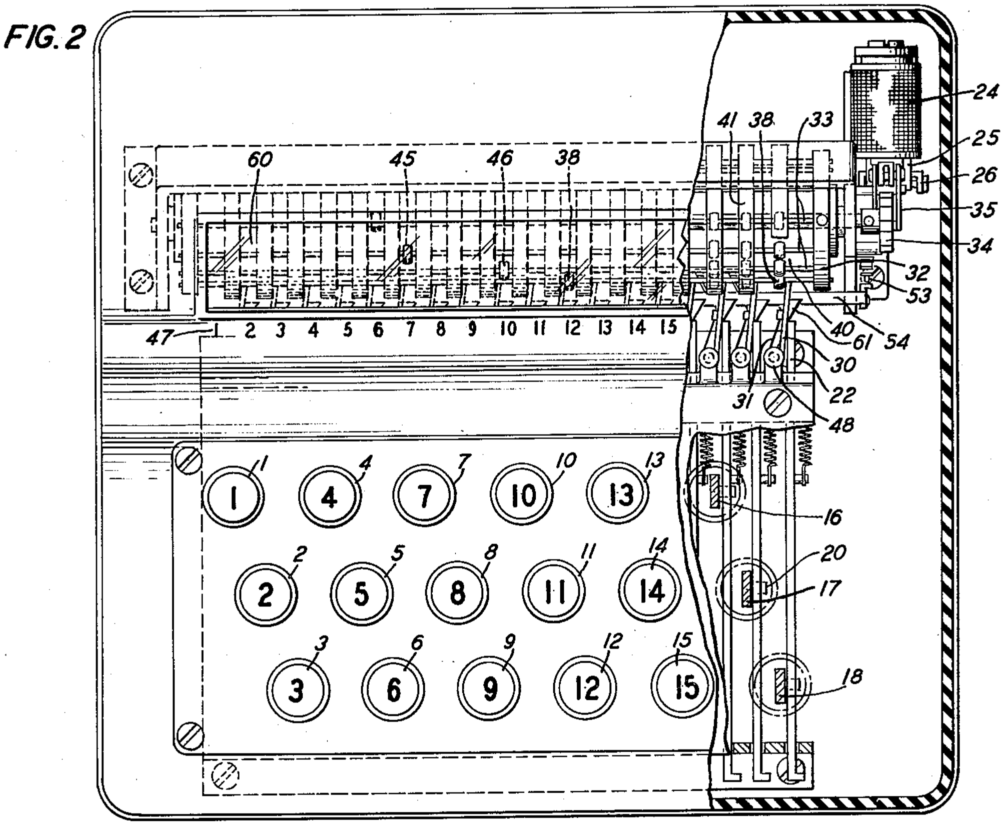
Fig. 2 is a top view with portion of the keyboard cut away to show the arrangement of the key-indicating elements.
Figure 4:
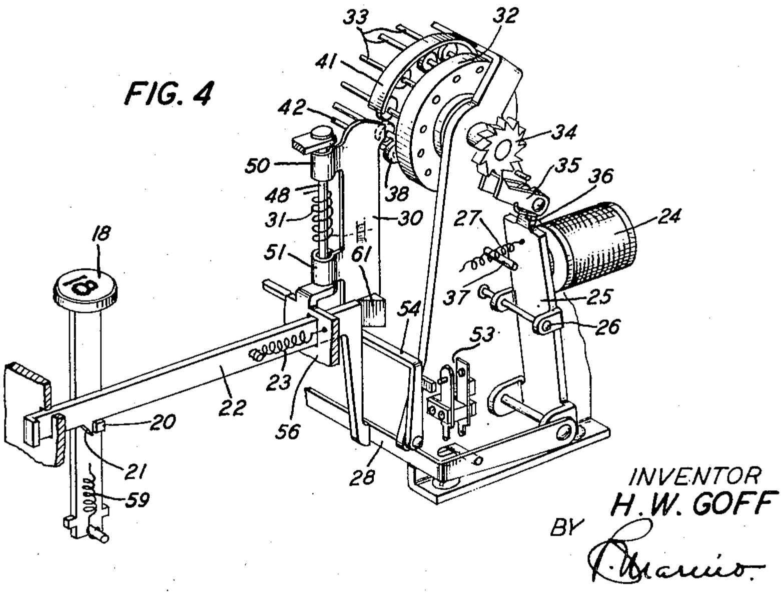

In accordance with the present invention, a pivoted leaf is provided for each slide. The leaf 30, for example, is associated with the slide 22, and is rotatively supported at 50 and 51 by the spindle 48. The leaf's restoring spring 31 is attached to the leaf and to the upper key guide 58 and presses the leaf to the right, as best shown in Fig. 2. Each leaf is provided with a camming surface 61 at the lower end thereof, the rear end of the associated slide 22, when locked by the projection 21 and lug 20, clearing said surface, as shown in Figs. 1, 2 and 4. It is evident that when the slide is thrust back consequent to the depression of the associated key, the camming surface 61 is engaged by the end of the slide to cause the leaf 30 to be rotated to the left against the tension of spring 31 for a purpose to be noted hereinafter.

A cage 32 comprising rods, such as rod 33, is rotatably mounted in front of the leaves where it is partly visible to the operator through a window 60, as shown in Figs. 1 and 2. A ratchet 34, fixed to one end of the cage 32 is engaged by a pawl 35 pivoted on armature 25 and held in engagement with said ratchet by the spring 36. The pawl 35 is adjusted so that, when magnet 24 is deenergized and armature 25 is against the stop 37, one of the rods 33 is adjacent to the upper ends of the leaves 30. While in the present embodiment of the invention twelve rods are used, the number of rods is immaterial and may be any convenient number. On each rod 33 is slidably mounted a series of beads 38, one bead being provided on each rod for each key. Corresponding beads on the various rods are normally aligned and hidden from the operator by a shield 41, one of which is provided for each row of beads. At 40 in Fig. 2, one of the shields is broken away to show the normal alignment of the beads.

When one of the keys, for example key 18, is depressed, the slide 22 is released and drawn to the rear by spring 23, as described above. As said slide moves, the end thereof adjacent to spring 23 engages the camming surface 61 of the leaf 30 and swings said leaf to the left (in Fig. 2). The upper end of said leaf engages bead 38 and slides it to the left (in Fig. 2) along rod 33 from beneath the shield 41, so that said bead becomes visible to the operator, as shown in Fig. 2. When magnet 24 is energized, restoring slide 22 as above described, pawl 35 is drawn back and engages a new tooth of ratchet 34. When magnet 24 is then deenergized, pawl 35, impelled by spring 27, rotates the cage 32 so that rod 42 now comes in alignment with the upper ends of the leaves 30. Upon depression of another key, a bead on rod 42 is now displaced by the leaf associated with said key in the manner described above, and becomes visible. When magnet 24 is again energized and deenergized, cage 32 is rotated, as previously described, bringing another rod into alignment with the upper ends of the leaves 30. Then, when another key is depressed, a corresponding bead on said rod is displaced. These operations are repeated, as described, for every key depressed.

The beads thus displaced and visible to the operator, show the last several keys depressed and the order in which they were depressed. For example, in Fig. 2 the visible beads 45, 46 and 38 show that keys 7, 10 and 12, respectively were depressed in that order. To assist in identifying the visible beads, the character marked on each key may also be marked on the case of the machine, as shown at 47 in Fig. 2.

Cage 32 continuing to rotate as successive keys are depressed, each displaced bead, such as bead 38, comes in contact with a bent portion 62 of the shield 41, as shown in Fig. 5, which is formed as a guide, and, on further rotation of cage 32, said bead is guided back to its normal position on rod 33 beneath said shield. Said bead is then no longer visible to the operator, even upon continued rotation of cage 32, unless displaced by depression of key 18, as described above. The relation between the number of rods and the guide portions of the shields may be adjusted so that any desired maximum number of displaced beads are visible to the operator.

What is claimed is:

1. An operator's keyset comprising in combination with non-locking operable keys, a plurality of circularly supported rotatable rods, each rod mounting thereon a displaceable indicator for each of said keys, all the indicators for the same key on the different rods being normally in alignment with each other, a shield for each aligned group of indicators covering said indicators from view in their normal position, means responsive to the operation of one of said keys for rotating said rods one step and for displacing outside of the shield an indicator in the group of indicators appertaining to said operated key, thereby to expose said displaced indicator to view in alignment with said operated key, said means being responsive to the subsequent operation of another one of said keys for rotating said rods another step and for displacing outside of the shield an indicator in the group of indicators pertaining to said subsequently operated key, thereby to expose said latter displaced indicator to view in alignment with said subsequently operated key, the position on its rod of said last displaced indicator relative to the position on its rod of said first displaced indicator indicating the sequence in which said first and second keys were operated.

2. An operator's keyset comprising in combination a plurality of non-locking operable keys, a plurality of circularly supported rotatable rods mounted in the proximity of said keys, a displaceable indicator mounted on each of said rods for each of said keys, the indicators for the same key on the different rods being all in alignment with each other, a fixed shield for each group of aligned indicators normally covering said indicators from view, each of said shields terminating in a curved portion, means responsive to the operation of one of said keys for rotating said rods one step and for displacing outside of the shield one of the indicators in the group of indicators appertaining to said operated key, thereby to expose said indicator to view in alignment with said operated key, said means being similarly operative in response to the subsequent operation of other of said keys for rotating said rods one step for each key operated and for moving outside of the shield one of the indicators in the group of indicators appertaining to each of said subsequently operated keys, thereby to expose each of said displaced indicators to view severally in alignment with each of said subsequently operated keys to which they appertain, the displaced indicator on the rod nearest the key in alignment with said indicator indicating that said key was last operated, each of said displaced indicators being returned under the appertaining shield into alignment with other indicators of the group by the curved portion of said shield upon the rotation of the rod containing said displaced indicator past the curved portion of said shield.

HAROLD W. GOFF.

REFERENCES CITED

The following references are of record in the file of this patent:

UNITED STATES PATENTS

| Number | Name | Date |
|---|---|---|
| 396,483 | Hazlett | Jan. 22, 1889 |
| 462,105 | Stilwell | Oct. 27, 1891 |
| 2,092,378 | Prues | Sept. 7, 1937 |
| 2,255,909 | Avery | Sept. 16, 1941 |
| 2,298,939 | Griffiths | Oct. 13, 1942 |
| 2,342,652 | Eakins | Feb. 29, 1944 |
| 2,371,491 | Wright | Mar. 13, 1945 |
| 2,388,313 | Dowey | Nov. 6, 1945 |

FOREIGN PATENTS

| Number | Country | Date |
|---|---|---|
| 344,260 | Germany | Nov. 18, 1921 |